United States Patent
Röckrath et al.

(10) Patent No.: US 6,410,646 B1
(45) Date of Patent: Jun. 25, 2002

(54) METHOD FOR PRODUCING SCRATCH RESISTANT COATINGS, ESPECIALLY FOR PRODUCING MULTI-LAYER ENAMELS

(75) Inventors: Ulrike Röckrath, Senden; Peter Betz, Münster; Fritz Bartol, Hamm; Georg Wigger; Hubert Baumgart, both of Münster, all of (DE)

(73) Assignee: BASF Coatings AG, Muenster-Hiltrup (DE)

(*) Notice: Subject to any disclaimer, the term of this patent is extended or adjusted under 35 U.S.C. 154(b) by 0 days.

(21) Appl. No.: 09/380,524

(22) PCT Filed: Mar. 6, 1998

(86) PCT No.: PCT/EP93/01265

§ 371 (c)(1),
(2), (4) Date: Nov. 8, 1999

(87) PCT Pub. No.: WO98/40442

PCT Pub. Date: Sep. 17, 1998

(30) Foreign Application Priority Data

Mar. 7, 1997 (DE) ......................................... 197 09 465

(51) Int. Cl.$^7$ ................................................. C08F 8/90
(52) U.S. Cl. ........................ 525/124; 524/507; 524/558; 525/328.8; 525/375
(58) Field of Search ................................ 525/124, 375; 524/507, 558

(56) References Cited

U.S. PATENT DOCUMENTS

| | | | |
|---|---|---|---|
| 3,542,714 A | 11/1970 | Hartmann et al. | 260/77.5 |
| 4,029,842 A | 6/1977 | Yoshida et al. | 428/334 |
| 5,425,970 A | 6/1995 | Lahrmann et al. | 427/493 |
| 5,486,384 A | 1/1996 | Bastian et al. | 427/493 |
| 5,565,243 A | 10/1996 | Mauer et al. | 427/407.2 |
| 5,609,918 A | 3/1997 | Yamaguchi et al. | 427/407.1 |
| 5,716,678 A | 2/1998 | Röckrath et al. | 427/407.1 |
| 5,889,115 A | 3/1999 | Yabuta et al. | 525/208 |
| 6,040,009 A | 3/2000 | Marutani et al. | 427/241 |

FOREIGN PATENT DOCUMENTS

| | | | | |
|---|---|---|---|---|
| DE | A-28 18 100 | 11/1978 | | |
| DE | A-33 33 072 | 9/1983 | | |
| DE | 33 16 593 A1 | 11/1984 | | C08G/63/76 |
| DE | A-36 28 124 | 8/1986 | | |
| DE | A-38 14 853 | 5/1988 | | |
| DE | C-39 18 968 | 6/1989 | | |
| DE | A-39 03 804 | 8/1990 | | |
| DE | 38 36 370 C2 | 1/1992 | | C08G/63/91 |
| DE | A-43 10 414 | 3/1993 | | |
| DE | A-42 04 518 | 8/1993 | | |
| DE | 43 41 235 A1 | 12/1993 | | C09D/5/46 |
| DE | 195 06 978 A1 | 2/1995 | | C09D/175/04 |
| EP | 0 002 866 A1 | 12/1978 | | C08F/283/00 |
| EP | A-38 127 | 3/1981 | | |
| EP | 0 054 105 A1 | 12/1981 | | C08G/63/46 |
| EP | A-69 936 | 7/1982 | | |
| EP | A-0 089 497 | 2/1983 | | |
| EP | 0 204 161 A2 | 5/1986 | | C08G/18/50 |
| EP | A-228 003 | 12/1986 | | |
| EP | A-0 260 447 | 8/1987 | | |
| EP | A-320 552 | 12/1987 | | |
| EP | A-195 931 | 2/1988 | | |
| EP | A-0 297 576 | 6/1988 | | |
| EP | A-604 922 | 12/1993 | | |
| EP | 0 767 185 | 6/1995 | | |
| EP | 0 774 499 A2 | 11/1996 | | C09D/143/04 |
| EP | WO 97/08235 | 3/1997 | | C08K/5/3492 |
| GB | 124 6601 | 1/1970 | | C07C/69/54 |
| GB | A-2 012 191 | 12/1978 | | |

OTHER PUBLICATIONS

M. Rösler, E. Klinke and G. Kunz in Farbe + Lack, vol. 10, '1994, pp. 837–843.

Loren W. Hill, Journal of Coatings Technology, vol. 64, No. 808, May 1992, pp. 29 to 41.

BASF brush test as described in Fig. 2 on p. 28 of the article by Betz and A. Bartelt, Progress in Organic Coatings, 22 (1993), pp. 27–37.

S. Sano et al., "Relationship between Viscoelastic Property and Scratch Resistance of Top–.Coat Clear Film", Toso Kagaku 1994, 29 (12), pp. 475–480.

B.V. Gregorovich and P.J. McGonical, Proceedings of the Advanced Coatings Technology Conference, Illinois, USA, Nov. 3–5, 1992, pp. 121–125.

Murayama, T., Dynamic Mechanical Analysis of Polymeric Material, Elsevier, New York, 1978 and Loren W. Hill, Journal of Coatings Technology, vol. 64, No. 808, May 1992, pp. 31 to 33.

Courter, 23 Annual International Waterborne, High–Solids and Powder Coatings Symposium, New Orleans 1996.

*Primary Examiner*—Bernard Lipman

(57) ABSTRACT

A process for producing scratch-resistant coatings, especially scratch-resistant multicoat finishes, involving use of coating compositions which, after curing, have a storage modulus E' in the rubber-elastic range of at least $10^{7.5}$ Pa and a loss factor tan$\delta$ at 20° C. of at least 0.05, the storage modulus E' and the loss factor having been measured by dynamic mechanical thermoanalysis on free films having a film thickness of 40±10 $\mu$m, and comprise as binders one or more polyacrylate resins having a hydroxyl number of from 100 to 240, an acid number of from 0 to 35, and a number-average molecular weight of from 1500 to 10,000, and as crosslinkers one or more free or blocked isocyanates and/or triazine-based components which crosslink with the hydroxyl groups of the binder to form ether and/or ester structures.

19 Claims, No Drawings

METHOD FOR PRODUCING SCRATCH RESISTANT COATINGS, ESPECIALLY FOR PRODUCING MULTI-LAYER ENAMELS

FIELD OF THE INVENTION

The present invention relates to a process for producing scratch-resistant coatings, especially scratch-resistant multicoat finishes.

The present invention relates, furthermore, to coating compositions suitable for this process.

BACKGROUND ART

In past years, great progress has been made in developing acid-resistant and etch-resistant clearcoats for the OEM finishing of automobiles. More recently, there is now an increasing desire in the automotive industry for scratch-resistant clearcoats which at the same time retain the level attained hitherto in terms of their other properties.

At present, however, there are different test methods for the quantitative assessment of the scratch resistance of a coating, examples being testing by means of the BASF brush test, by means of the washing brush unit from the company AMTEC, or various test methods of automakers and others. A disadvantage, however, is that it is frequently impossible to correlate the individual test results. In other words, the test results for one and the same coating may have very different outcomes depending on the test method chosen, and passing one scratch resistance test does not, under certain circumstances, permit conclusions to be drawn about the behavior of that coating in a different scratch test.

There is therefore a desire for a standardized method of quantitatively assessing the scratch resistance which enables reliable statements to be made about the scratch resistance of the coating from just one examination of the sample. In particular, the result of this examination should permit reliable conclusions to be drawn about the scratch resistance of the coating in the various abovementioned scratch resistance tests.

The literature, indeed, has already described a number of investigations relating to the physical processes taking place during the production of scratches in a coating, and correlations, derived therefrom, between the scratch resistance and other physical parameters of the coating. A contemporary review of various literature relating to scratch-resistant coatings can be found, for example, in J. L. Courter, $23^{rd}$ Annual International Waterborne, High-Solids and Powder Coatings Symposium, New Orleans 1996.

Furthermore, for example, the article by S. Sano et al., "Relationship between Viscoelastic Property and Scratch Resistance of Top-Coat Clear Film", Toso Kagaku 1994, 29 (12), pages 475–480 uses a washing brush test to determine the scratch resistance of different, heat-curing melamine/acrylate or isocyanate/acrylate systems and correlates the scratch resistance found with viscoelastic properties of the coating.

From the test results described in that article, the authors conclude that coatings would exhibit good scratch resistance when either the so-called "inter-crosslinking molecular weight" was below 500 or when the glass transition temperature was 15° C. or less, it being necessary, however, in the case of clearcoat films in the automotive sector, for the glass transition temperature to be above 15° C. in order to achieve sufficient hardness of the coatings.

In the article by M. Rösler, E. Klinke and G. Kunz in Farbe+Lack, Volume 10, 1994, pages 837–843, too, the scratch resistance of various coatings is investigated by means of different test methods. The article found that, under a given load, hard coatings exhibit greater damage and thus lower scratch resistance than soft coatings.

Still furthermore, in the conference report of B. V. Gregorovich and P. J. McGonical, Proceedings of the Advanced Coatings Technology Conference, Illinois, USA, Nov. 3–5, 1992, pages 121–125, it is found that increasing the plastic nature (toughness) of coatings improves the scratch resistance, owing to the improvement in plastic flow (greater healing), although limits are imposed on the increase in plastic nature by the other properties of the coating.

Further yet, P. Betz and A. Bartelt in Progress in Organic Coatings, 22 (1993), pages 27–37 disclose various methods of determining the scratch resistance of coatings. That article makes reference, furthermore, to the fact that the scratch resistance of coatings is influenced not only by the glass transition temperature but also, for example, by the homogeneity of the network.

That article proposes increasing the scratch resistance of clearcoat coatings by incorporating siloxane macromonomers, since these siloxane macromonomers lead to increased homogeneity of the clearcoat surface and, above 60° C, to an improved plastic flow.

The correlation between storage modulus and crosslinking density, furthermore, is known, for example, from Loren W. Hill, Journal of Coatings Technology, Vol. 64, No. 808, May 1992, pages 29 to 41. However, that article contains no statements or indications as to how scratch-resistant coatings can be obtained.

DE-C-39 18 968, furthermore, discloses a process for coating surfaces using clearcoats, based on hydroxyl-containing resins and polyisocyanates, whose composition is established such that the clearcoat film, after curing, has a molecular weight of the chain between the crosslinks of up to 200 (measured in accordance with the xylene swelling method). However, even these clearcoats are still in need of improvement in respect of the scratch resistance of the resultant coatings.

Finally, DE-A-43 10 414 and DE-A-42 04 518 disclose nonaqueous clearcoats based on hydroxyl-containing acrylate resins and isocyanates, for the production of multicoat finishes, where the resulting coatings are notable for improved scratch resistance and good other service properties. However, even with these clearcoats there is a desire for an even greater improvement in scratch resistance.

Although many scratch-resistant finishes and methods of producing same are known, a need still exists in the art for a process for producing coatings having further-improved scratch resistance. At the same time, the coating compositions employed in this process should, furthermore, be suitable as a clearcoat and/or topcoat for producing a multicoat finish, especially in the automotive sector. In addition, the coatings should exhibit high gloss, good chemical resistance and good weathering stability.

SUMMARY OF THE INVENTION

The object of the present invention is, therefore, to provide such coating compositions and a process for producing coating using such coating compositions which fulfills the need in the art.

It is another object of the present invention to establish a criterion for assessing the scratch resistance of the cured coating objectively, independently of the particular test method chosen, on the basis of physical parameters. The method of determining the physical parameters according to the invention is able to be used under practical conditions and with sufficient accuracy to enable the scratch resistance to be characterized in a way which is at least adequate to visual evaluation.

These objects are, surprisingly, achieved by a process for producing scratch-resistant coatings which comprises the steps of providing at least one coating compositions and forming a scratch-resistant coating on a surface using the coating compositions wherein the coating compositions after curing, have a storage modulus E' in a rubber-elastic range of at least $10^{7.5}$ Pa and a loss factor tanδ at 20° C. of at least 0.05, the storage modulus E' and the loss factor tanδ having been measured by dynamic mechanical thermoanalysis on homogeneous free films having a film thickness of 40±10 µm the coating compositions comprise as binders one or more polyacrylate resins having a hydroxyl number of from 100 to 240, preferably more than 160 to 220 and, with particular preference, from 170 to 200, an acid number of from 0 to 35, preferably from 0 to 25, and a number-average molecular weight of from 1500 to 10,000, preferably from 2500 to 5000, and as crosslinkers one or more free isocyanates, blocked isocyanates and triazine-based components which crosslink with hydroxyl groups of the binders to form ether and/or ester structures.

The present specification relates, furthermore, to a process for producing a scratch-resistant multicoat finish and to coating compositions suitable for this process.

It is surprising and was not foreseeable that, merely by measuring the viscoelastic properties of free films by means of dynamic mechanical thermoanalysis (also referred to for short below as DMTA) there is available a universal, representative selection criterion for the provision of coating compositions which lead to scratch-resistant coatings. At the same time, the results of the DMTA measurements can be correlated with the results of the different test methods for scratch resistance, so that, on the basis solely of the results of the DMTA measurements, statements are possible about the results in other scratch resistance tests, such as, for example, the BASF brush test or the AMTEC test, or various test methods of the automakers.

Other objects, advantages and salient features of the invention will be apparent from the following detailed description.

DETAILED DESCRIPTION OF THE PRESENTLY PREFERRED EMBODIMENTS OF THE INVENTION

In the text below, the coating compositions employed in the process of the invention for producing scratch-resistant coatings are elucidated first of all.

It is essential to the invention that the coating composition be selected such that the cured coating composition has a storage modulus E' in the rubber-elastic range of at least $10^{7.5}$ Pa, preferably of at least $10^{7.6}$ Pa and, with particular preference, of at least $10^{7.7}$ Pa and a loss factor at 20° C. of at least 0.05, preferably at least 0.07, the storage modulus E' and the loss factor tanδ having been measured by dynamic mechanical thermoanalysis on homogeneous free films having a film thickness of 40±10 µm. The loss factor tanδ is defined as the quotient between the loss modulus E" and the storage modulus E'.

Dynamic mechanical thermoanalysis is a widely known measurement method for determining the viscoelastic properties of coatings and is described, for example, in Murayama, T., Dynamic Mechanical Analysis of Polymeric Material, Elsevier, N.Y. 1978 and Loren W. Hill, Journal of Coatings Technology, Vol. 64, No. 808, May 1992, pages 31 to 33.

The measurements can be carried out using, for example, the instruments MK II, MK III or MK IV from the company Rheometric Scientific.

The storage modulus E' and the loss factor tanδ are measured on homogeneous free films. The free films are prepared in conventional manner by applying the coating composition to, and curing it on, substrates to which the coating composition does not adhere. Examples of suitable substrates that may be mentioned are glass, Teflon® and, in particular, polypropylene. Polypropylene has the advantage of ready availability and is therefore normally employed as a support material.

The film thickness of the free films employed for the measurement is generally 40±10 µm.

The specific selection of the coating compositions by way of the value of the storage modulus in the rubber-elastic range and of the loss factor at 20° C. of the cured coating compositions simplifies the provision of coatings having the desired good scratch resistance, since both parameters can be determined by means of simple DMTA measurements.

In this context it is surprising that even coating materials which have only a moderate or even low plastic component but yet have a high to very high storage modulus give rise to coatings having high scratch resistance. As the tanδ value increases, and with a sufficiently high storage modulus E', however, there is generally an increase in the scratch resistance of the resulting coatings. At the same time, however, other performance properties of the coatings may deteriorate, so that in this case, owing to the other properties, the tanδ value should be not more than 0.2, preferably not more than 0.1.

The coating compositions of the invention that are employed in the process for producing scratch-resistant coatings comprise as binders one or more polyacrylate resins having a hydroxyl number of from 100 to 240, preferably more than 160 to 220 and, with particular preference, from 170 to 200, an acid number of from 0 to 35, preferably from 0 to 25, and a number-average molecular weight of from 1500 to 10,000, preferably from 2500 to 5000. Suitable polyacrylate resins in this case are, in principle, all those having the stated parameters (OH number, acid number and molecular weight) provided they lead after crosslinking to coatings having the stated viscoelastic parameters.

As is generally known, however, the particular chosen monomer composition, for example, also has an influence, inter alia, on these viscoelastic parameters of the cured coating. For example, the storage modulus E' generally decreases as the styrene content of the acrylate resins goes up. It is therefore preferred that the binders employed comprise acrylate resins containing (in copolymerized form) not more than 15% by weight, based on the overall weight of all monomers of the acrylate resin, of vinylaromatic hydrocarbons, especially styrene.

Furthermore, as binders in the coating compositions of the invention, preference is given to the use of acrylate resins having as many primary hydroxyl groups as possible (with particular preference, at least 50% and up to 100% of the OH groups are primary OH groups), since a more complete reaction of the primary OH groups, in comparison to secondary OH groups, likewise enables an increase in the storage modulus E' of the cured coatings.

In addition, preference is given to the use as binders of acrylate resins having a glass transition temperature of not more than 70° C., and particular preference to those having a glass transition temperature of from −40 to +30° C.

The glass transition temperature can be calculated approximately by the skilled worker with the aid of the formula $$1/T_g = \Sigma W_n/T_{gn}$$

$T_g$=Glass transition temperature of the polymer
$W_n$=Weight fraction of the nth monomer
$T_{gn}$=Glass transition temperature of the homopolymer of the nth monomer.

Finally, other binders employed are preferably acrylate resins obtainable by polymerizing (a) from 25 to 62, preferably from 41 to 57% by weight of 4-hydroxy-n-butyl acrylate or 4-hydroxy-n-butyl methacrylate or a mixture of 4-hydroxy-n-butyl acrylate and 4-hydroxy-n-butyl methacrylate, (b) from 0 to 36% by weight, preferably from 0 to 20% by weight, of a non-(a) hydroxyl-containing ester of acrylic acid or a hydroxyl-containing ester of methacrylic acid or a mixture of such monomers, (c) from 28 to 75% by weight, preferably from 34 to 54% by weight, of a non-(a) and non-(b) aliphatic or cycloaliphatic ester of methacrylic acid having at least 4 carbon atoms in the alcohol residue or a mixture of such monomers, (d) from 0 to 3, preferably from 0 to 2% by weight of an ethylenically unsaturated carboxylic acid or a mixture of ethylenically unsaturated carboxylic acids, and (e) from 0 to 20, preferably from 5 to 15% by weight of a non-(a), non-(b), non-(c) and non-(d) ethylenically unsaturated monomer or a mixture of such monomers to give the polyacrylate resin, the sum of the weight fractions of components (a), (b), (c), (d) and (e) always being 100% by weight and the composition of component (c) being chosen such that polymerization of component (c) alone gives a polymethacrylate resin having a glass transition temperature of from 0 to +80, preferably from 0 to +60° C.

The polyacrylate resins which are employed with preference in accordance with the invention can be prepared by polymerization techniques which are common knowledge, and the disclosure of this publication is incorporated herein by reference and have been described on numerous occasions (cf. e.g.: Houben-Weyl, Methoden der organischen Chemie, 4$^{th}$ Edition, Volume 14/1, pages 24 to 255 (1961)).

The polyacrylate resins which are employed with preference in accordance with the invention are prepared in particular with the aid of the solution polymerization technique. This technique customarily comprises introducing an organic solvent or solvent mixture and heating it to boiling. The monomer mixture to be polymerized along with one or more polymerization initiators are then added continuously to this organic solvent or solvent mixture. The polymerization takes place at temperatures between 100 and 160° C., preferably between 130 and 150° C. The polymerization initiators employed are preferably initiators which form free radicals. The nature and amount of initiator are customarily chosen such that the supply of free radicals is largely constant during the feed phase at the polymerization temperature.

Examples of initiators which can be employed are dialkyl peroxides, such as di-tert-butyl peroxide and dicumyl peroxide; hydroperoxides, such as cumene hydroperoxide and tert-butyl hydroperoxide; peresters, such as tert-butyl perbenzoate, tert-butyl perpivalate, tert-butyl per-3,5,5-trimethylhexanoate and tert-butyl per-2-ethylhexanoate; and bisazo compounds, such as azobisisobutyronitrile.

The polymerization conditions (reaction temperature, feed time of the monomer mixture, nature and amount of the organic solvents and polymerization initiators, possible use of molecular weight regulators, such as mercaptans, thioglycolic esters and chlorinated hydrocarbons, for example) are selected such that the polyacrylate resins preferably employed have a number-average molecular weight of from 1500 to 10,000, preferably from 2500 to 5000 (determined by gel permeation chromatography using a polystyrene standard).

The acid number of the polyacrylate resins employed in accordance with the invention can be established by the skilled worker by using appropriate amounts of component (d). Similar comments apply to the establishment of the hydroxyl number. It can be regulated by way of the amount of component (a) and (b) employed.

As component (a) use is made of 4-hydroxy-n-butyl acrylate, 4-hydroxy-n-butyl methacrylate or a mixture of 4-hydroxy-n-butyl acrylate and 4-hydroxy-n-butyl methacrylate. As component (a) it is preferred to employ 4-hydroxy-n-butyl acrylate.

Further components suitable as polyacrylate component (a) are the hydroxy-functional compounds specified in European Patent Application EP 0 767 185 and in the U.S. Pat. Nos. 5,480,943, 5,475,073 and 5,534,598.

Subject to the proviso that polymerization of component (b) alone gives a polyacrylate resin having a glass transition temperature of from 0 to +80, preferably from 0 to +60° C., the component (b) employed can in principle be any hydroxyl-containing ester of acrylic acid or methacrylic acid, other than (a), or a mixture of such monomers. Examples are hydroxyalkyl esters of acrylic acid, such as hydroxyethyl acrylate and hydroxypropyl acrylate, for example, and hydroxyalkyl esters of methacrylic acid, such as hydroxyethyl methacrylate and hydroxypropyl methacrylate, for example, and also the products of esterification of hydroxyalkyl (meth)acrylates with one or more molecules of ε-caprolactone.

As component (c) it is possible in principle to employ any aliphatic or cycloaliphatic ester of methacrylic acid having at least 4 carbon atoms in the alcohol residue, other than (a) and (b), or a mixture of such monomers. Examples are aliphatic esters of methacrylic acid having 4 to 20 carbon atoms in the alcohol residue, such as n-butyl, isobutyl, tert-butyl, 2-ethylhexyl, stearyl and lauryl methacrylate, for example, and cycloaliphatic esters of the methacrylic acid, such as cyclohexyl methacrylate, for example. The composition of component (c) is selected such that polymerization of component (c) alone gives a polymethacrylate resin having a glass transition temperature of from 0 to +80° C., preferably from 0 to +60° C.

As component (d) it is possible in principle to employ any ethylenically unsaturated carboxylic acid or a mixture of ethylenically unsaturated carboxylic acids.

As component (d) it is preferred to employ acrylic acid and/or methacrylic acid.

As component (e) it is possible in principle to employ any ethylenically unsaturated monomer other than (a), (b), (c) and (d), or a mixture of such monomers. Examples of monomers which can be employed as component (e) are vinylaromatic hydrocarbons, such as styrene, α-alkylstyrene and vinyltoluene, amides of acrylic acid and methacrylic acid, such as methacrylamide and acrylamide, for example; nitriles of methacrylic acid and acrylic acid; and vinyl ethers and vinyl esters. As component (e) it is preferred to employ vinylaromatic hydrocarbons, especially styrene.

The composition of component (e) is preferably selected such that polymerization of component (e) alone gives a polymer having a glass transition temperature of from +70 to +120, preferably from +80 to +100° C.

The coating compositions employed in the process for producing scratch-resistant coatings comprise as crosslinker one or more free or blocked isocyanates and/or triazine-based components which crosslink with the hydroxyl groups of the binder to form ether and/or ester structures. Where blocked isocyanates are present, the coating compositions of the invention are one-component (1C) clearcoats. Where free isocyanates are present, the coating compositions of the invention are two-component (2C) clearcoats.

As crosslinker it is possible in principle to employ any polyisocyanate which can be employed in the coatings sector, or a mixture of such polyisocyanates, provided the cured coatings have the abovementioned viscoelastic properties. It is preferred, however, to employ polyisocyanates whose isocyanate groups are attached to aliphatic or cycloaliphatic radicals.

Examples of such polyisocyanates are hexamethylene diisocyanate, isophorone diisocyanate, trimethylhexamethylene diisocyanate, dicyclohexylmethane diisocyanate and 1,3-bis(2-isocyanatoprop-2-yl)benzene (TMXDI), 1,3- and 1,4-bis(isocyanatomethyl)cyclohexane, and adducts of these polyisocyanates with polyols, especially low molecular mass polyols, such as trimethylolpropane, for example, and polyisocyanates which are derived from these polyisocyanates and contain isocyanurate groups and/or biuret groups. Polyisocyanates employed with particular preference are hexamethylene diisocyanate and isophorone diisocyanate, polyisocyanates which are derived from these diisocyanates, contain isocyanurate groups and/or biuret groups and preferably have more than 2 isocyanate groups in the molecule, and also products of the reaction of hexamethylene diisocyanate and isophorone diisocyanate or a mixture of hexamethylene diisocyanate and isophorone diisocyanate with from 0.3 to 0.5 equivalent of a low molecular mass polyol having a molecular weight of from 62 to 500, preferably from 104 to 204, in particular a triol, such as trimethylolpropane, for example.

For blocking the polyisocyanates it is possible in principle to employ any blocking agent which can be employed for the blocking of polyisocyanates and has a sufficiently low deblocking temperature. Blocking agents of this kind are well known to the skilled worker and need not be elucidated further here. It is preferred to employ blocked polyisocyanates which contain both isocyanate groups blocked with a blocking agent (I) and isocyanate groups blocked with a blocking agent (II), the blocking agent (I) being a dialkyl malonate or a mixture of dialkyl malonates, the blocking agent (II) being a CH-acidic blocking agent other than (I), an oxime, or a mixture of these blocking agents, and the ratio of equivalents between the isocyanate groups blocked with (I) and the isocyanate groups blocked with (II) being between 1.0:1.0 and 9.0:1.0, preferably between 8.0:2.0 and 6.0:4.0 and, with particular preference, between 7.5:2.5 and 6.5:3.5.

The blocked polyisocyanates employed with preference and their preparation are also described, for example, in DE-A-43 10 414, page 4 line 56 to page 5 line 50.

Dialkyl malonates or a mixture of dialkyl malonates are or is employed as blocking agent (I). Examples of dialkyl malonates which can be employed are dialkyl malonates having in each case 1 to 6 carbon atoms in the alkyl radicals, such as dimethyl malonate and diethyl malonate, for example, preference being given to the use of diethyl malonate.

The blocking agents used as (II) comprise blocking agents containing active methylene groups, other than (I); oximes, and mixtures of these blocking agents. Examples of blocking agents (II) are methyl, ethyl, propyl, butyl, pentyl, hexyl, heptyl, octyl, nonyl, decyl or dodecyl acetoacetate, acetone oxime, methyl ethyl ketoxime, acetylacetone, formaldoxime, acetaldoxime, benzophenoxime, acetoxime and diisobutyl ketoxime. As blocking agent (II) it is preferred to employ an alkyl acetoacetate having 1 to 6 carbon atoms in the alkyl radical or a mixture of such alkyl acetoacetates or a ketoxime or a mixture of ketoximes. Particular preference is given to the use of alkyl acetoacetates or methyl ethyl ketoxime as blocking agent (II).

Further suitable blocking agents are dimethylpyrazole and/or triazoles.

The crosslinkers which react with the hydroxyl groups of the binder to form ether structures comprise amino resins. Amino resins are well known to the skilled artisan and are offered by many companies as commercial products. They comprise condensates of aldehydes, especially formaldehyde, with, for example, urea, melamine, guanamine and benzoguanamine. The amino resins contain alcohol groups, preferably methylol groups, which in general are partially or, preferably, fully etherified with alcohols. Use is made in particular of melamine-formaldehyde resins etherified with lower alcohols, especially with methanol or butanol. As crosslinkers, very particular preference is given to the use of melamine-formaldehyde resins which are etherified with lower alcohols, especially with methanol and/or ethanol and/or butanol, and which still contain on average from 0.1 to 0.25 hydrogen atoms attached to nitrogen atoms per triazine ring.

The triazine-based crosslinkers which react with the hydroxyl groups of the binder to form ester groups comprise transesterification crosslinkers, such as preferably tris (alkoxycarbonylamino)triazine or the like, as also described, for example, in EP-A-604 922, and the disclosure of these publications are incorporated herein by reference.

The coating compositions of the invention normally comprise binders and crosslinkers in amounts such that the binder or binders is or are present in an amount of from 40 to 90, preferably from 50 to 75% by weight, and the crosslinker or crosslinkers in an amount of from 10 to 60, preferably from 25 to 50% by weight, the weight percentages being based on binder+ crosslinker=100% by weight.

The coating compositions of the invention are formulated on an aqueous basis or, preferably, on a conventional basis, i.e., on the basis of organic solvents. Examples of solvents suitable for the preparation of the conventional clearcoats are the solvents employed to prepare the acrylate resins.

The transparent coating compositions employed in accordance with the invention contain only transparent pigments, if any. The coating compositions may, furthermore, also include further customary additives, such as light stabilizers, leveling assistants, etc., for example.

It is, however, also possible to prepare pigmented coating compositions which are not transparent. In order to achieve this, it is possible in principle to employ any suitable organic or inorganic pigments, or mixtures of such pigments, which are suitable for the production of pigmented coating materials. Examples of pigments which can be employed are the following: azo pigments (e.g. Pigment Red 57:1, Pigment Yellow 1, Pigment Yellow 13 and Pigment Red 7), phthalocyanine pigments (e.g. Pigment Blue 15:3 and phthalocyanine green), carbonyl pigments (e.g. Pigment Red 88, Pigment Red 177, Pigment Yellow 123, Pigment Violet 19, Pigment Yellow 24 and Pigment Orange 51 and 52), dioxazine pigments (e.g. Pigment Violet 23), titanium dioxide, carbon black, ion oxide black (magnetite, triiron tetroxide), iron oxide red (hematite, diiron trioxide), iron oxide yellow (iron oxide hydroxide), iron oxide brown (mixed pigment of iron oxide red, iron oxide yellow and iron oxide black), chromium oxide green (dichromium trioxide), nickel titanium yellow, chromium titanium yellow, and cobalt blue. It is also possible to employ effect pigments, examples being metal flake pigments, especially aluminum flake pigments, and pearl luster pigments.

In the preparation of pigmented coating materials which are not transparent, binders, crosslinkers and the pigment or mixture of pigments are generally employed in amounts such that the binder or binders is or are present in an amount of from 39 to 90, preferably from 45 to 75% by weight, the crosslinker or crosslinkers in an amount of from 9 to 60, preferably from 20 to 50% by weight, and the pigment or mixture of pigments in an amount of from 1 to 40, preferably from 5 to 15% by weight, the percentages by weight being based on binder + crosslinker + pigment or mixture of pigments=100% by weight.

With the pigmented coating compositions which are not transparent it is also possible to produce finishes, especially single-coat finishes, having very good properties.

The coating compositions of the invention can be applied to glass and a wide variety of metal substrates, such as, for example, aluminum, steel, various iron alloys and the like. Preferably, they are employed as a clearcoat or topcoat in the field of automotive finishing (automotive OEM finishing and—when free isocyanates are used—in the area of automotive refinishing as well). In addition to their application to a wide variety of metals, the coating compositions can of course also be applied to other substrates, such as, for example, wood, paper, plastics, mineral substrates or the like. They are, furthermore, also suitable for use in the field of the coating of packaging containers in the field of the coating of films for the furniture industry and the like.

Preferably, however, the coating compositions of the invention are employed as topcoat in processes for producing a multicoat finish, especially in the field of OEM automotive finishing. The present invention therefore also relates to a process for producing multicoat finishes in which (1) a pigmented basecoat is applied to the substrate surface, (2) a polymer film is formed from the basecoat, (3) a transparent topcoat is applied atop the resultant basecoat film, and then (4) the basecoat film and the topcoat film are cured together, which comprises employing as topcoat a coating composition of the invention.

In stage (1) of the process of the invention it is possible in principle to employ any pigmented basecoats suitable for producing two-coat finishes. Such basecoats are well known to the skilled worker. It is possible to employ both water-thinnable basecoats and basecoats based on organic solvents. Suitable basecoats are described, for example, in U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003, EP-A-38 127 and DE-A-28 18 100, and the disclosure of these publications are incorporated herein by reference. These patent documents also contain further information relating to the basecoat/clearcoat technique in question.

In stage (2) of the process of the invention the basecoat film applied in stage (1) is dried, i.e., in an evaporation phase, at least part of the organic solvents and/or of the water is removed from the basecoat film. The basecoat film is generally dried at temperatures ranging from room temperature up to 80° C.

Subsequently, the topcoat of the invention is applied and basecoat and topcoat are cured together, customarily by heating at temperatures ranging from 120 to 155° C for a period of from 20 to 40 minutes. Through a suitable choice of crosslinkers it is also possible to use lower stoving or heating temperatures, as customary in the field of refinishing and the coating of plastics, of below 100° C, preferably below 80° C.

The coatings produced using the coating compositions of the invention are notable for a scratch resistance which is markedly improved relative to conventional coatings.

The scratch resistance of the cured coatings can be assessed as follows with the aid, for example, of the BASF brush test as described in FIG. 2 on page 28 of the article by P. Betz and A. Bartelt, Progress in Organic Coatings, 22 (1993), pages 27–37, but modified in terms of the weight used (2000 g instead of the 280 g specified therein).

In this technique, the film surface is damaged using a weighted mesh fabric. The mesh fabric and the film surface are wetted generously with a detergent solution. The test panel is moved forward and backward in reciprocal movements under the mesh fabric by means of a motor drive.

To produce the test panels, an electrodeposition coating material is applied first of all in a film thickness of 18–22 $\mu$m, then a surfacer in a film thickness of 35–40 $\mu$m, then a black basecoat in a film thickness of 20–25 $\mu$m and, finally, the test coating composition in a film thickness of 40–45 $\mu$m, each of the films being cured. Following application of the coating materials, the panels are stored at room temperature for at least 2 weeks before the test is conducted.

The test element is an eraser (4.5×2.0 cm, broad side perpendicular to the direction of scratching) lined with nylon mesh fabric (No. 11, 31 $\mu$m mesh size, $T_g$ 50° C). The applied weight is 2000 g.

Prior to each test the mesh fabric is replaced, with the running direction of the fabric meshes parallel to the direction of scratching. Using a pipette, about 1 ml of a freshly stirred 0.25% strength Persil solution is applied before the eraser. The rotational speed of the motor is set so that 80 double strokes are performed in a period of 80 s. After the test, the remaining washing liquid is rinsed off with cold tap water and the test panel is blown dry using compressed air.

A measurement is made of the gloss in accordance with DIN 67530 before and after damage (direction of measurement perpendicular to the direction of scratching).

Although there have been described what are presently considered to be the preferred embodiments of the invention, it will be understood that variations and modifications may be made thereto within the scope of the appended claims.

What is claimed is:

1. A coating composition that has, after curing, a storage modulus E' in a rubber-elastic range of at least $10^{7.5}$ Pa and a loss factor tanδ at 20° C. of at least 0.05, the storage modulus E' and the loss factor tanδ having been measured by dynamic mechanical thermoanalysis on homogeneous free films having a film thickness of 40±10 μm; and said coating composition comprises:

at least one binder comprising at least one polyacrylate resin having a hydroxyl number of from greater than 200 to 240, an acid number of from 0 to 35 and a number-average molecular weight of from 1500 to 10,000;

a crosslinker consisting of a compound selected from the group consisting of free isocyanates, blocked isocyanates, triazine-based components, and mixtures thereof wherein the triazine-based component crosslinks with hydroxyl groups of the binder to form at least one of an ether and an ester structure; and wherein when a triazine-based component is present in the coating composition, the polyacrylate resin further comprises in its reaction product at least one ethylenically unsaturated carboxylic acid.

2. A process for producing multicoat finishes comprising the steps of:

(1) applying a pigmented basecoat to a substrate surface, (2) drying or crosslinking the basecoat film, (3) applying a transparent topcoat atop the resultant basecoat film and then (4) curing the topcoat film, said topcoat comprising a coating composition that has, after curing, a storage modulus E' in a rubber-elastic range of at least $10^{7.5}$ Pa and a loss factor tanδ at 20° C. of at least 0.05, the storage modulus E' and the loss factor tanδ having been measured by dynamic mechanical thermoanalysis on homogeneous free films having a film thickness of 40±10 μm; and said coating composition comprises:

at least One binder comprising at least one polyacrylate resin having a hydroxyl number of from greater than 200 to 240, an acid number of from 0 to 35 and a number-average molecular weight of from 1500 to 10, 000;

a crosslinker consisting of a compound selected from the group consisting of free isocyanates, blocked isocyanates, triazine-based components, and mixtures thereof, wherein the tiazine-based component crosslinks with hydroxyl groups of the binder to form at least one of an ether and an ester structure; and wherein when a triazine-based component is present in the coating composition, the polyacrylate resin further comprises in its reaction product at least one ethylenically unsaturated carboxylic acid.

3. A process as-claimed in claim 2, wherein the coatings produced by said process are multicoat automotive finishes.

4. A coating composition as claimed in 1, wherein the coating composition after curing has at least one of a storage modulus E' in the rubber-elastic range of at least $10^{7.6}$ Pa, and a loss factor tanδ at 20° C. of at least 0.07.

5. A coating composition as claimed in claim 1, wherein the coating composition comprises as said binder at least one of: one or more polyacrylate resins having a hydroxyl number of more than 200 to 220; and has an acid number of from 0 to 25 and a number-average molecular weight of from 2500 to 5000.

6. A coating composition as claimed in claim 1, wherein the coating composition comprises as said binder one or more polyacrylate resins which have at least one of the following characteristics:

are obtained using not more than 15% by weight, based on the overall weight of the monomers employed to prepare the polyacrylate resin, of vinylaromatic hydrocarbons;

has a glass transition temperature of not more than +70° C.; and in which at least 50%- of the OH groups are primary OH groups.

7. A coating composition as claimed in claim 1, wherein the coating composition comprises as said binder one or more polyacrylate resins, each of said polymerizable resins being obtained by polymerizing (a) from 21 to 62% by weight of compounds selected from the group consisting of 4-hydroxy-n-butyl acrylate, 4-hydroxy-n-butyl methacrylate and mixtures thereof, (b) from 0 to 36% by weight, of a compounds different from (a) selected from the group consisting of hydroxyl-containing esters of acrylic acid and a hydroxyl-containing esters of methacrylic acid and mixtures thereof, (c) from 28 to 75% by weight, preferably from 34 to 54% by weight, of a compound selected from the group consisting of aliphatic esters of methacrylic acid, cycloaliphatic esters of methacrylic acid, different from (a) and (b) wherein the esters have at least 4 carbon atoms in the alcohol residue and mixtures of such monomers, (d) from 0 to 3% by weight of an ethylenically unsaturated carboxylic acid or a mixture of ethylenically unsaturated carboxylic acids, and (e) from 0 to 20, preferably from 5 to 15% by weight of an ethylenically unsaturated monomers or a mixture of such monomers different from (a), (b), (c) and (d), the sum of the weight fractions of components (a), (b), (c), (d) and (e) always being 100% by weight and the composition of component (c) being chosen such that polymerization of component (c) alone gives a polymethacrylate resin having a glass transition temperature of from 0 to +80° C.

8. A coating composition as claimed in claim 7, wherein the coating composition comprises as said binder one or more polyacrylate resins obtained using a component (e) selected such that polymerization of component (e) alone gives a polymer having a glass transition temperature of from +70 to +120° C.

9. A coating composition as claimed in claim 1, wherein the coating composition comprises as said crosslinkers isocyanates which contain both isocyanates blocked with a blocking agent (I) and isocyanates blocked with a blocking agent (II), the blocking agent (I) being a dialkyl malonate or a mixture of dialkyl malonates, the blocking agent (II) being at least one of a CH-acidic blocking agent other than (I) and an oxime, and a ratio of equivalents between the isocyanate groups blocked with (1) and the isocyanate groups blocked with (II) being between 1.0:1.0 and 9.0:1.0.

10. A coating composition as claimed in claim 1, wherein the coating composition comprises as said crosslinkers isocyanates having free isocyanate groups.

11. A coating composition as claimed in claim 1, wherein the crosslinker consists of at least one isocyanate and at least one tris(alkoxycarbonylamino)triazine.

12. A coating composition as claimed in claim 1, wherein the coating composition after curing has at least one of a storage modulus E' in the rubber-elastic range of at least $10^{7.7}$ Pa, and a loss factor tanδ at 20° C. of at least 0.07.

13. A coating composition as claimed in claim 1, wherein the coating composition comprises as said binder one or more polyacrylate resins which have at least one of the following characteristics:

are obtained using not more than 15% by weight, based on the overall weight of the monomers employed to prepare the polyacrylate resin, of vinylaromatic hydrocarbons;

has a glass transition temperature from −40 to +30° C.; and in which at least 50%- of the OH groups are primary OH groups.

14. A coating composition as claimed in claim 7, wherein the polymerization of component (c) alone gives a polymethacrylate resin having a glass transition temperature of from 0 to +60° C.

15. A coating composition as claimed in claim 9, wherein the ratio of equivalents between the isocyanate groups blocked with (I) and the isocyanate groups blocked with (II) is between 8.0:2.0 and 6.0:4.0.

16. A coating composition as claimed in claim 9, wherein the ratio of equivalents between the isocyanate groups blocked with (I) and the isocyanate groups blocked with (II) is between 7.5:2.5 and 6.5:3.5.

17. A process for producing a scratch-resistant coating comprising providing at least one coating composition and forming a scratch resistant coating on, a surface, wherein the at least one coating composition, after curing, has a storage modulus E' in a rubber-elastic range of at least $10^{7.5}$ Pa and a loss factor tan δ at 20° C. of at least 0.05, the storage modulus E' and the loss factor tan δ having been measured by dynamic mechanical thermoanalysis on homogeneous free films having a film thickness of 40±10 μm; and the at least one coating composition comprises at least one binder comprising at least one polyacrylate resin having a hydroxyl number of from greater than 200 to 240, an acid number of from 0 to 35 and a number-average molecular weight of from 1500 to 10,000;

a crosslinker consisting of a compound selected from the group consisting of free isocyanates, blocked isocyanates, triazine-based components, and mixtures thereof, wherein the triazine-based component crosslinks with hydroxyl groups of the binder to form at least one of an ether and an ester structure; and wherein when a tiazine-based component is present in the coating composition, the polyacrylate resin further comprises in its reaction product at least one ethylenically unsaturated carboxylic acid.

18. The process of claim 17, wherein at least one of the following:

a. the coating composition after curing has at least one of a storage modulus E' in the rubber-elastic range of at least $10^{7.6}$ Pa, and a loss factor tan δ at 20° C. of at least 0.07;

b. the coating composition comprises as said binder at least one polyacrylate resin having a hydroxyl number of more than 200 to 220; an acid number of from 0 to 25; and a number-average molecular weight of from 2500 to 5000;

c. the coating composition comprises as said binder one or more polyacrylate resins that have at least one of the following characteristics: are prepared from not more than 15% by weight, based on the overall weight of the monomers employed to prepare the polyacrylate resin, of vinylaromatic hydrocarbons; has a glass transition temperature of not more than +70° C.; and in which at least 50%- of the OH groups are primary OH groups;

d. the coating composition comprises as said binder one or more polyacrylate resins, each of said polyacrylate resins comprising the reaction product of:
 (i) from 21 to 62% by weight of compounds selected from the group consisting of 4-hydroxy-n-butyl acrylate, 4-hydroxy-n-butyl methacrylate, and mixtures thereof,
 (ii) from 0 to 36% by weight, of a non-(i) hydroxyl containing ester of acrylic acid or a hydroxyl-containing ester of methacrylic acid or a mixture of such monomers,
 (iii) from 28 to 75% by weight, compounds different from (i) and (ii) and comprising compounds selected from the group consisting of aliphatic and cycloaliphatic esters of methacrylic acid having at least 4 carbon atoms in the alcohol residue and mixtures of such monomers,
 (iv) from 0 to 3% by weight of an ethylenically unsaturated carboxylic acid or a mixture of ethylenically unsaturated carboxylic acids, and
 (v) from 0 to 20% by weight of ethylenically unsaturated monomers different from (i), (ii), (iii) and (iv) and mixtures thereof, the sum of the weight fractions of components (i), (ii), (iii), (iv) and (v) always being 100% by weight and the composition of component (iii) being chosen such that polymerization of component (iii) alone gives a polymethacrylate resin having a glass transition temperature of from 0 to +80° C.;

e. the coating composition comprises as said crosslinkers isocyanates that contain both isocyanates blocked with a blocking agent (I) and isocyanates blocked with a blocking agent (II), the blocking agent (I) being a dialky malonate or a mixture of dialkyl malonates, the blocking agent (II) being at least one of a CH-acidic blocking agent other than (I) and an oxime, and a ratio of equivalents between the isocyanate groups blocked with (I) and the isocyanate groups blocked with (II) being between 1.0:1.0 and 9.0:1.0; and f. the crosslinker consists of at least one isocyanate and at least one tris(alkoxycarbonylamino)triazine.

19. The process of claim 18, wherein the binder comprises at least one polyacrylate resin obtained using a component (v) selected such that polymerization of component (v) alone gives a polymer having a glass transition temperature of from +70 to +120° C.

* * * * *

UNITED STATES PATENT AND TRADEMARK OFFICE
CERTIFICATE OF CORRECTION

PATENT NO. : 6,410,646 B1
DATED : June 25, 2002
INVENTOR(S) : Röckrath et al.

It is certified that error appears in the above-identified patent and that said Letters Patent is hereby corrected as shown below:

<u>Title page,</u>
Item [86], please delete "PCT/EP93/01265", and insert -- PCT/EP98/01265 --.

Signed and Sealed this

Twenty-fifth Day of March, 2003

JAMES E. ROGAN
*Director of the United States Patent and Trademark Office*